United States Patent
Prudlow et al.

(10) Patent No.: US 10,914,582 B2
(45) Date of Patent: Feb. 9, 2021

(54) SURVEYING SYSTEM AND ROTATING MIRROR FOR A SURVEYING SYSTEM

(71) Applicant: Trimble Jena GmbH, Jena (DE)

(72) Inventors: Wolfram Prudlow, Jena (DE); Michael Kötzing, Jena (DE); Michael Vogel, Schleifreisen (DE); Richard Day, Bry-sur-Marne (FR); Steffen Laabs, Jena (DE); Ute Natura, Jena (DE)

(73) Assignee: Trimble Jena GmbH, Jena (DE)

( * ) Notice: Subject to any disclaimer, the term of this patent is extended or adjusted under 35 U.S.C. 154(b) by 0 days.

(21) Appl. No.: 16/663,694

(22) Filed: Oct. 25, 2019

(65) Prior Publication Data
US 2020/0263985 A1 Aug. 20, 2020

(30) Foreign Application Priority Data
Feb. 15, 2019 (EP) .................................. 19157560

(51) Int. Cl.
| | | |
|---|---|---|
| *G02B 5/08* | (2006.01) | |
| *G01C 15/00* | (2006.01) | |
| *G02B 7/182* | (2021.01) | |
| *G01B 11/26* | (2006.01) | |

(52) U.S. Cl.
CPC ............. *G01C 15/006* (2013.01); *G02B 5/08* (2013.01); *G02B 7/1821* (2013.01); *G01B 11/26* (2013.01)

(58) Field of Classification Search
CPC ...... G01C 15/006; G02B 5/08; G02B 7/1821; G01B 11/26
USPC ........................................................ 356/138
See application file for complete search history.

(56) References Cited

U.S. PATENT DOCUMENTS

| | | | | |
|---|---|---|---|---|
| 4,054,791 | A  * | 10/1977 | Du Shane ................. | F21L 2/00 362/35 |
| 5,426,417 | A  * | 6/1995 | Stanuch ............... | B60Q 1/2611 340/471 |
| 5,517,388 | A  * | 5/1996 | Hutchisson .......... | B60Q 1/2611 362/284 |
| 7,869,005 | B2 * | 1/2011 | Ossig .................... | G01S 7/4817 356/5.01 |
| 2008/0074279 | A1* | 3/2008 | Chiu .................... | B60Q 1/2611 340/815.45 |
| 2012/0293881 | A1* | 11/2012 | Krueger .................. | F24S 25/30 359/853 |
| 2013/0300556 | A1* | 11/2013 | Wang ................... | B60Q 1/2611 340/471 |
| 2014/0049784 | A1* | 2/2014 | Woloschyn ........... | G01S 7/4817 356/625 |
| 2014/0063489 | A1* | 3/2014 | Steffey .................... | G01S 17/89 356/72 |
| 2014/0226190 | A1* | 8/2014 | Bridges .............. | H04N 1/00827 358/475 |

(Continued)

*Primary Examiner* — Roy M Punnoose
(74) *Attorney, Agent, or Firm* — Kilpatrick Townsend & Stockton LLP (57) ABSTRACT

A surveying system, comprises a support; a rotating mirror unit including a mounting structure, a motor mounted on the mounting structure and having a shaft rotatable about a first axis, and a mirror mounted on the shaft; a measuring unit including a mounting structure and a light source and optics mounted on the mounting structure for directing a beam of measuring light onto the mirror surface; and a window mechanically connecting the mounting structure of the measuring unit and the mounting structure of the rotating mirror unit.

20 Claims, 5 Drawing Sheets

(56) References Cited

U.S. PATENT DOCUMENTS

2015/0096181 A1\* 4/2015 Plangger .............. G01C 15/002
                                                                                   33/290

\* cited by examiner

SURVEYING SYSTEM AND ROTATING MIRROR FOR A SURVEYING SYSTEM

CROSS-REFERENCE TO RELATED APPLICATIONS

The present application claims priority to EP Application No. 19 157 560.4, filed Feb. 15, 2019, the contents of which are incorporated herein by reference in their entirety for all purposes.

FIELD

The present invention relates to surveying systems having rotating mirrors and to rotating mirrors for surveying systems.

BACKGROUND

A conventional surveying system comprises a measuring unit generating a beam of measuring light which can be directed to a point on an object. The object reflects or scatters the incident measuring light such that the measuring unit receives some of this light back from the object. The measuring unit may then determine the distance of the object from the measuring unit based on a time flight analysis, for example.

The surveying system further comprises a rotating mirror, wherein the measuring unit directs the generated beam onto the rotating mirror from which the beam is reflected to positions on the object depending on the rotational positions of the mirror. The mirror can be driven at a high speed so that the beam of measuring light is scanned across objects located around the surveying system in order to perform a high number of distance measurements or other measurements.

In many fields of use of surveying systems having rotating mirrors it is desirable to perform highly accurate measurements at high frequencies. This imposes high demands on the mechanical and optical quality of the components of the surveying system. These demands result in high costs for obtaining and maintaining a surveying system.

SUMMARY

Based on the above, it is an object of the present invention to provide a surveying system and a rotating mirror for a surveying system having simplified structures while allowing relatively high performances.

According to embodiments of the invention, a surveying system comprises a support, a rotating mirror unit mounted on the support and including a rotating mirror, a measuring unit mounted on the support and including a light source and optics configured to direct a beam of measuring light onto the rotating mirror. The support can be, for example, an alidade, which is mounted on a base to be rotatable about an axis in order to change directions of the beam reflected from the rotating mirror. The base can be mounted, for example, on a tripod or other stand for holding the surveying system in a measuring environment.

According to exemplary embodiments, the surveying system comprises a window made of a material transmitting light of the beam, wherein the window is arranged in a beam path of the beam of measuring light reflected from the rotating mirror. The window may have a function of preventing dust and other particles from entering a housing of the surveying system and deteriorating its performance. It is not required that the window is traversed by the light of the beam at all possible rotational positions of the rotating mirror. However, the window may have an extension sufficient to allow the beam to traverse the window over a sufficient range of rotational positions of the rotating mirror in order to perform desired surveying tasks.

According to some embodiments, the window extends around an axis of rotation of the rotating mirror over a range of more than 220° and, in particular, a range of more than 270°. According to other exemplary embodiments, the window fully surrounds the axis of rotation of the rotatable mirror such that the beam of measuring light is transmitted through the window at all possible rotational positions of the rotating mirror.

According to some embodiments, the window mechanically connects a mounting structure of the measuring unit and a mounting structure of the rotating mirror unit. The mounting structure of the rotating mirror unit provides support for a motor having a shaft rotatable about the axis of rotation of the rotating mirror, and a mirror having a mirror surface, wherein the mirror is mounted on the shaft of the motor. The mounting structure of the measuring unit provides support for a light source and optics configured to generate a beam of measuring light and to direct the beam of measuring light onto the mirror surface.

The mechanical connection between the mounting structure of the measuring unit and the mounting structure of the rotating mirror unit can be provided such that, if one of the units is fixed to the support, the other unit does not require to be supported separately since the other unit is mounted on and carried by the window which, in turn, is mounted on and carried by the unit mounted on the support.

According to particular embodiments, the surveying system comprises a support, wherein the mounting structure of the measuring unit is mounted on and carried by the support, whereas the mounting structure of the rotating mirror unit is carried by the window. In particular, apart from the window, there is not provided any other means for supporting the rotating mirror unit and for carrying its weight.

According to other embodiments, the surveying system comprises a support, wherein the mounting structure of the rotating mirror is mounted on and carried by the support, whereas the mounting structure of the measuring unit is carried by the window. In particular, apart from the window, no other means are provided for supporting the measuring unit and for carrying its weight.

According to some embodiments, the light source and optics are configured to emit the beam of measuring light along an axis which substantially coincides with the axis of rotation of the rotating mirror. Such configuration is advantageous in view of a measurement accuracy which can be achieved with the surveying system. In embodiments using the window for supporting one of the rotating mirror unit and the measuring unit, a required alignment of the axis of the beam of measuring light and the rotation axis can be achieved at lower efforts as compared to embodiments providing separate supports for the rotating mirror unit and the measuring unit.

According to some embodiments, the window extends around the axis of rotation of the rotating mirror over a range of more than 220° at a constant distance from the axis of rotation. In particular, at least one surface of the window may extend along a circle having its center on the axis of rotation.

According to particular embodiments herein, the mirror surface is a curved surface having a surface curvature selected such that an astigmatism induced on the beam of measuring light when traversing the window is compensated to at least some extent.

According to some embodiments herein, the mirror surface has a curvature such that a smallest osculating circle at a point where the axis of rotation of the rotational mirror intersects the mirror surface is contained in a plane which substantially coincides with the axis of rotation. According to other embodiments, the mirror surface has a curvature such that a smallest osculating circle at a point where the axis of rotation of the rotating mirror intersects the mirror surface is contained in a plane substantially orthogonal to a plane containing the axis of rotation and a center of the osculating circle. With such curvature, the astigmatism induced on the beam of measuring light when traversing the window can be compensated when the beam incident on the mirror surface is a parallel beam. Other curvatures can be used when the beam of measuring light incident on the mirror surface is a convergent or divergent beam.

There is an infinite number of osculating circles at the point of intersection of the axis of rotation and the mirror surface. Planes containing the osculating circles differ in their orientations about a surface normal of the mirror surface at the point of intersection. These osculating circles also have different radii. The osculating circle having the smallest radius defines the plane in which the mirror surface has its strongest curvature.

According to some embodiments, the invention provides a lightweight rotating mirror having a mirror body, wherein the mirror body includes a base portion configured to be mounted on a carrier rotatable about an axis of rotation. The carrier can be a shaft of a motor, for example.

The mirror body includes a mirror portion providing a mirror surface. The mirror body may comprise plural spaced apart ribs extending between the mirror portion and the base portion.

According to some embodiments, the base portion, the mirror portion and the plural ribs are integrally made of plastic.

According to some embodiments, the mirror body is formed by injection molding.

The mirror surface provided by the mirror portion may have a shape resulting from the manufacturing process for the integrally forming of the mirror body. If the mirror body is formed by injection molding, the shape of the mirror surface is determined by the shape of the mold used for the molding process. Subsequent to the forming of the mirror body, the metal layer can be applied to the mirror surface in order to improve the reflectivity of the mirror. The metal layer can be applied by evaporation, for example. The metal layer can be provided by an aluminum layer, for example.

According to other embodiments, a process of shaping the mirror surface can be applied to the mirror portion subsequent to the integrally forming of the mirror body, and prior to applying of the metal layer. Such shaping process may include grinding or polishing, for example.

It is desirable that the total mass of the rotating mirror is low. A low mass of the rotating mirror reduces the demands on bearings used in the motor for rotating mirror, for example. Moreover, when the mass of the mirror is sufficiently low, it might not be required to perform a separate process of balancing the rotating unit formed by the shaft of the motor and the mirror body. According to some embodiments, a motor having a fluid bearing is used for driving and carrying the rotating mirror. For example, the mirror may rotate at speeds of 10·1/s to 500·1/s.

A low mass of the mirror body can be achieved by providing spaces not filled with plastic material within the volume occupied by the mirror portion. Such spaces are provided between the adjacent ribs extending between the mirror portion and the base portion.

It is, however, advantageous to maintain at least some of the ribs extending between the mirror portion and the base portion instead of removing those ribs in order to provide further spaces in view of an even more reduced weight of the rotating mirror. The mirror surface is typically oriented under an angle of 45° relative to the axis of rotation. Therefore, the mirror portion has a proximal section located closer to the base portion than an opposite distal section of the mirror portion. Moreover, centrifugal forces acting on the mirror portion when it is rotated tend to change the angle of inclination of the mirror portion relative to the axis of rotation, resulting in a deformation of the rotating mirror and loss of measuring accuracy, accordingly. The ribs extending between the mirror portion and the base portion support the mirror portion relative to the base portion and help to maintain the orientation of the mirror portion relative to the axis of rotation during high speed rotation of the rotating mirror.

According to some embodiments, the ribs have main surfaces having surface portions extending substantially orthogonally to the mirror surface. Such arrangement may further increase the rigidity of the mirror body and may reduce deformation of the mirror body during rotation at high speeds.

According to some embodiments, there are two ribs which are, among the plural spaced apart ribs, arranged closest to a center of the mirror surface but at a distance from the center of the mirror surface. Specifically, the center of the mirror surface can be located at an intersection of the axis of rotation of the mirror with the mirror surface. A surface normal of the mirror surface at the mirror center extends between these two ribs extending from the backside of the mirror portion mentioned above. A distance between this surface normal and the surfaces of these ribs is greater than 3 mm or greater than 5 mm. This may have an advantage in that a quality of the shape of the mirror surface can be improved. When the mirror body is integrally formed by injection molding, some shrinking of material occurs upon solidification of the molded material. Such shrinking can be higher in those regions of the mirror portion where the ribs meet with the mirror portion. By spacing these regions apart from the center of the mirror, shrinking during solidification will less likely deform the mirror surface at the center of the mirror surface where the beam of measuring light is incident on the mirror surface.

According to some embodiments, the number of the plural ribs extending between the mirror portion and the base portion is an even number.

According to some exemplary embodiments, the mass of the mirror body is 0.020 kg or less.

According to some embodiments, the rotating mirror comprises an encoder ring mounted to the base portion. The encoder ring may carry a plurality of marks which can be optically detected in order to determine the rotational positions of the rotating mirror during rotation.

BRIEF DESCRIPTION OF THE DRAWINGS

Embodiments of the invention will be illustrated with reference to the drawings below. Herein.

DETAILED DESCRIPTION

Figure 1:
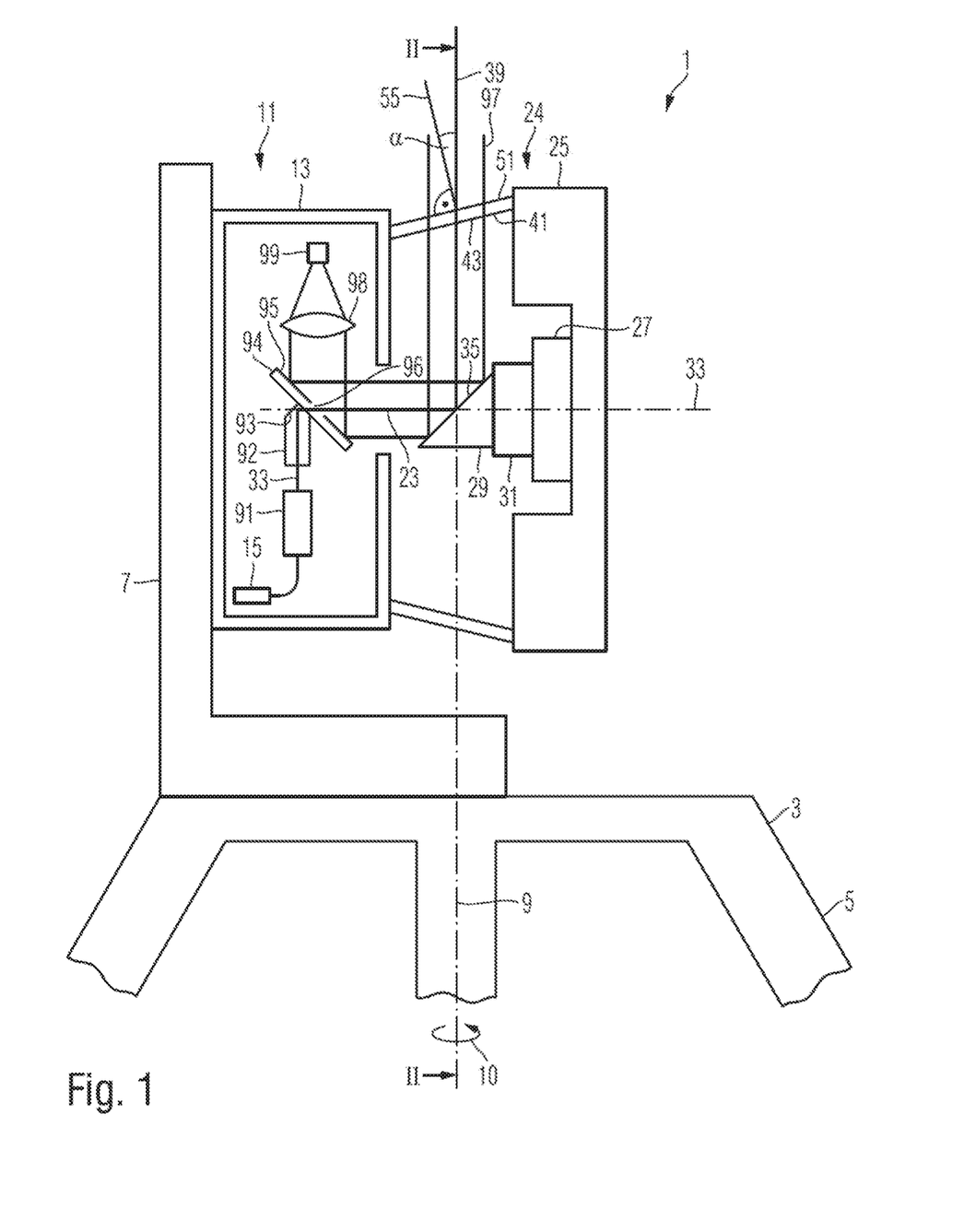
FIG. 1 is a schematic sectional view of a surveying system.
Figure 2:
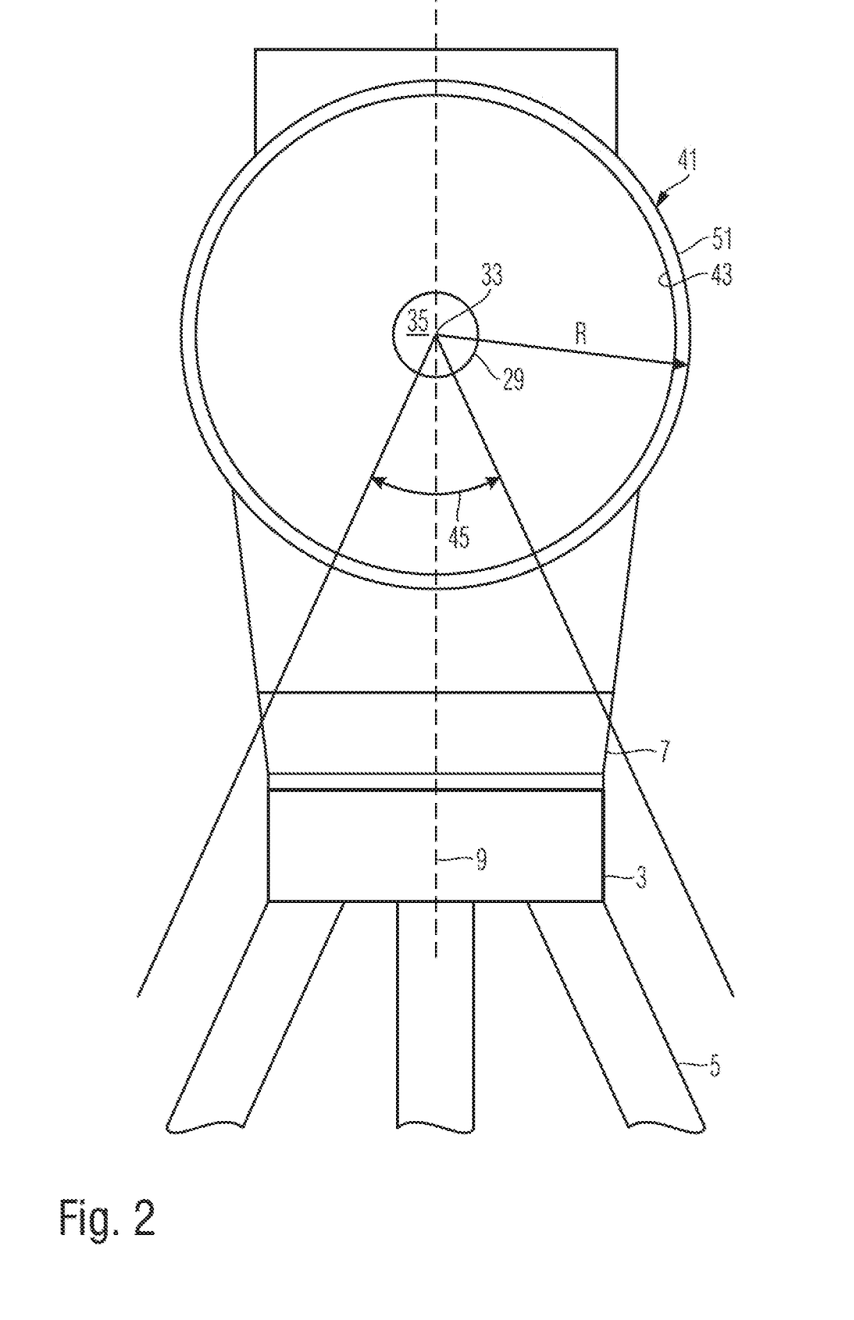
FIG. 2 is a sectional view of the surveying system shown in FIG. 1 along a line II-II shown in FIG. 1.

An exemplary surveying system will be illustrated with reference to FIGS. 1 and 2 below. Herein, FIG. 1 is a simplified sectional view schematically illustrating details of a surveying system, and FIG. 2 is a simplified sectional view of the surveying system along a line II-II shown in FIG. 1.

The surveying system 1 comprises a base 3 supported by a tripod 5, and an alidade 7. The alidade 7 is mounted on and carried by the base 3. Moreover, the alidade 7 can be rotated relative to the base about an axis 9 as indicated by an arrow 10 in FIG. 1. The tripod 5 can be adjusted such that the axis 9 is oriented in the vertical direction when the surveying system is used.

The surveying system further comprises a measuring unit 11 having a mounting structure 13 for carrying various components of the measuring unit 11. In the illustrated example, the mounting structure 13 is mounted on and carried by the alidade 7. In other examples, the alidade may also house and carry some components of the measuring unit such that the alidade performs some functions of the mounting structure of the illustrated example.

The measuring unit 11 further comprises a light source 15, such as a laser source, pulsed laser source and a fiber laser, for example. The light generated by the light source 15 is supplied to a collimator 91 in the illustrated example.

A thin beam 23 of measuring light is emitted from the collimator 91, enters a glass prism 92 and is reflected from an internal surface 93 of the prism 92. The beam 23 of measuring light leaves the prism 92 through a glass plate 94. The glass plate 94 has a mirror surface 95 having a surface normal which can be oriented relative to the axis 33 at an angle of 45 degrees, for example. The mirror surface 95 has a central portion 96 traversed by the beam 23 of measuring light. The central portion 96 may carry an antireflective coating such that a high amount of the measuring light is emitted as the beam 23 of measuring light from the prism 92. The beam 23 of measuring light is emitted in a direction orthogonal to the axis of rotation 9 of the alidade 7 relative to the base 3.

The surveying system further comprises a rotating mirror unit 24 including a mounting structure 25, a motor 27 and a rotating mirror 29. The motor 27 is mounted on and carried by the mounting structure 25. The motor 27 has a shaft 31 which rotates about an axis of rotation 33 when the motor 27 is operated. The rotating mirror 29 is mounted on the shaft 31 of the motor 27 and has a mirror surface 35 which rotates about the axis of rotation 33 when the motor 27 is operated. The mirror surface 35 is oriented under an angle of 45° relative to the axis of rotation 33.

The rotating mirror unit 24 is mounted relative to the measuring unit 11 such that the axis of rotation 33 is aligned parallel with the beam 23 of measuring light emitted from the measuring unit such that the beam 23 is incident on the mirror surface 35 at a location which is also intersected by the axis of rotation 33 of the rotating mirror 29. For this purpose, the rotating mirror 29 can be mounted on the shaft 31 of the motor 27 such that the orientation of the rotating mirror 29 relative to the shaft 31 can be adjusted within a suitable rage. Moreover, the motor 27 can be mounted on the mounting structure 25 such that the orientation of the motor 27 relative to the mounting structure 25 can be adjusted within a suitable range.

The beam 23 is incident on the mirror surface 35 and reflected from the mirror surface 35 as the beam of measuring light carrying reference numeral 39 in FIG. 1. The beam 39 of measuring light travels in a direction orthogonal to the axis of rotation 33 downstream of the rotating mirror 29. The beam 39 reflected from the mirror surface 35 traverses a window 41 arranged downstream of the rotating mirror 29 in the beam path of the measuring light. The beam 39 having traversed the window 41, may then be incident on an object located near the measuring system 1. Light scattered or reflected from the object travels back to the measuring system 1 as a broader beam 97, is incident on the rotating mirror 29 and directed by the rotating mirror 29 back to the measuring unit 11 where it is incident on the mirror 95. Apart from its central portion 96, the mirror surface 95 carries a reflective coating such that most of the light received back from the object is directed towards a focusing lens 98 concentrating the light received back from the object onto a detector 99.

The measuring unit 11 may include a processor (not shown in FIG. 1) for analyzing the signals detected by the detector 99. For example, a distance of the object from the measuring unit 1 may be determined by such analysis.

It is apparent from FIG. 2 that the window 41 fully surrounds the axis of rotation 33. An inner surface 43 of the window 41 has a constant distance R from the axis of rotation 33. The inner surface 43 of the window 41 is arranged on a circle about the axis of rotation 33, accordingly.

Since the window 41 fully surrounds the axis of rotation 33, the beam 39 of measuring light may traverse the window 49 at each rotational position of the rotating mirror 29. FIG. 2 shows an angular range 45 of about 30° in which the beam 39 of measuring light is incident on the alidade 7. This angular range can be greater or smaller than the exemplary value of 30° depending on the configuration of the alidade 7 and base 3 and other components capable of obstructing the beam 39 of measuring light. It is not possible to measure objects located within this angular range 45 relative to the surveying system 1. Objects located outside of this angular range 45 relative to the surveying system 1 can be measured using the beam 39 of measuring light.

The window 41 has a function of protecting the rotating mirror 29 and the measuring unit 11 from dust, particles and humidity which might otherwise deteriorate the function of these components.

Moreover, in the illustrated example, the window 41 carries the weight of the rotating mirror unit 24. For this purpose, the window 41 is mechanically connected to the mounting structure 31 of the measuring unit 11, and the window 41 is mechanically connected to the mounting structure 25 of the rotating mirror unit 24. The surveying system 1 does not include any other means for carrying the weight of the rotating mirror unit 24.

In other examples, the rotating mirror unit is mounted on and carried by the alidade, while the measuring unit is carried by the rotating mirror unit.

The surveying system 1 includes conventional means (not shown in the figures) for adjusting the light source 15, optics 17, 18, 19 and motor 27 such that the direction of the beam 23 and the axis of rotation 33 are substantially coincide. It has been found that the arrangement of these components relative to each other is maintained relatively stable and that, for example, changes in temperature have a relatively small influence on the alignment of the axis of rotation 33 with the beam 23. This allows for a stable operation and high achievable accuracy of the surveying system 1.

It can be seen from the section in FIG. 1 that an outer surface 51 of the window 41 is substantially parallel to the inner surface 43 of the window 41. A line 53 in FIG. 1 indicates a surface normal of the outer surface 51 of the mirror 41 at a location where the beam 39 traverses the window 41. Since the inner and outer surfaces 43, 51 of the window 41 are substantially parallel in the section shown in FIG. 1, the surface normal of the inner surface 43 substantially coincides with the surface normal 53 of the outer surface 51. A smallest angle α between the surface normal 53 and the direction of the beam 39 is different from zero. In the illustrated example, the angle α is 5°. The angle α different from zero has an advantage in that light of the measuring light beam 39 reflected from the inner and outer surfaces 43, 51 of the window 41 may not reach the detector of the measuring system 11 and contribute to background noise in the detected light. According to some examples, the surfaces 43 and 51 of the window 41 are not provided with an anti-reflective coating since an increase of detected background light is avoided by the angle α being greater than zero. Avoiding the antireflective coating allows to reduce the manufacturing costs of the surveying system. According to some examples, the outer surface 51 of the window 43 is provided with an anti-scratch coating.

Figure 3:
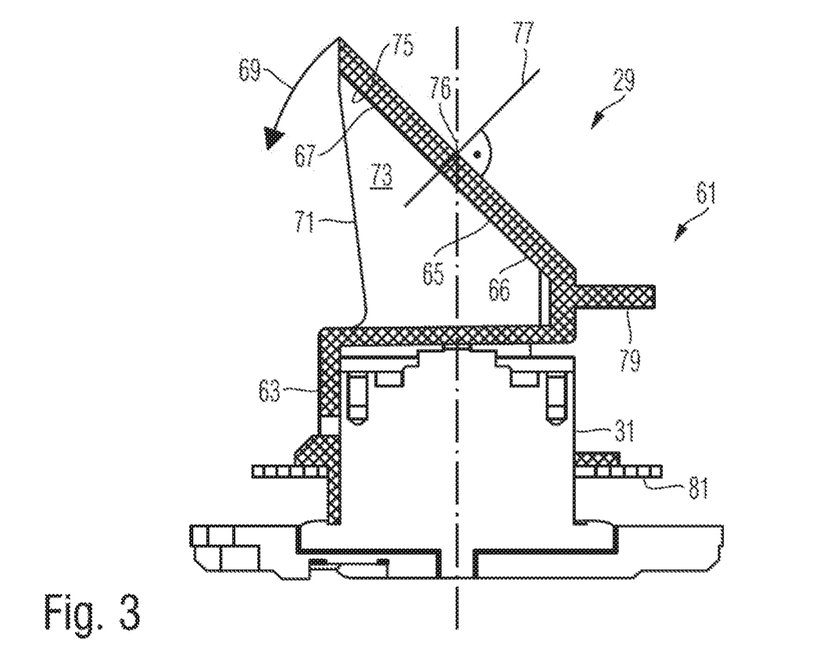
FIG. 3 is a sectional view of a rotating mirror which can be used in the surveying system shown in FIGS. 1 and 2.
Figure 4:
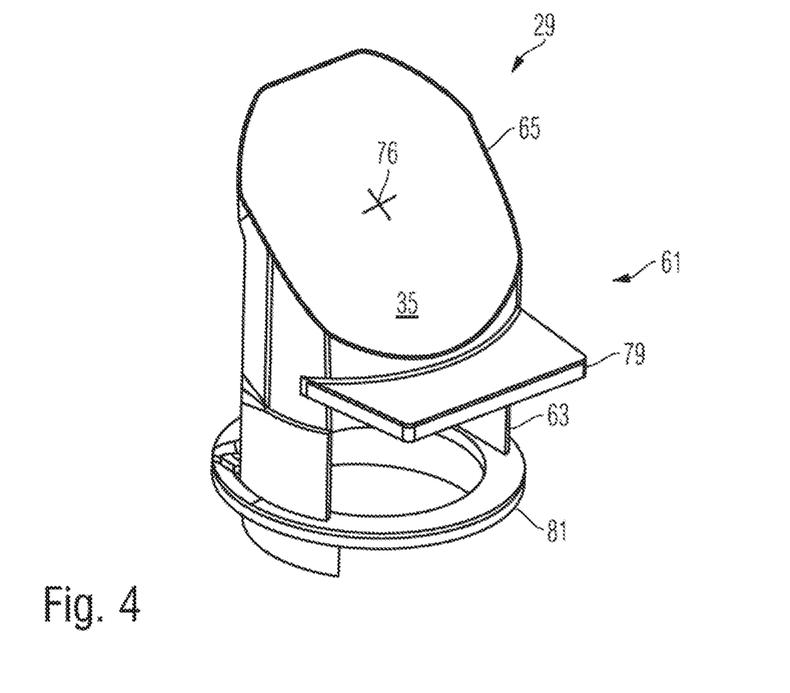
Figure 5:
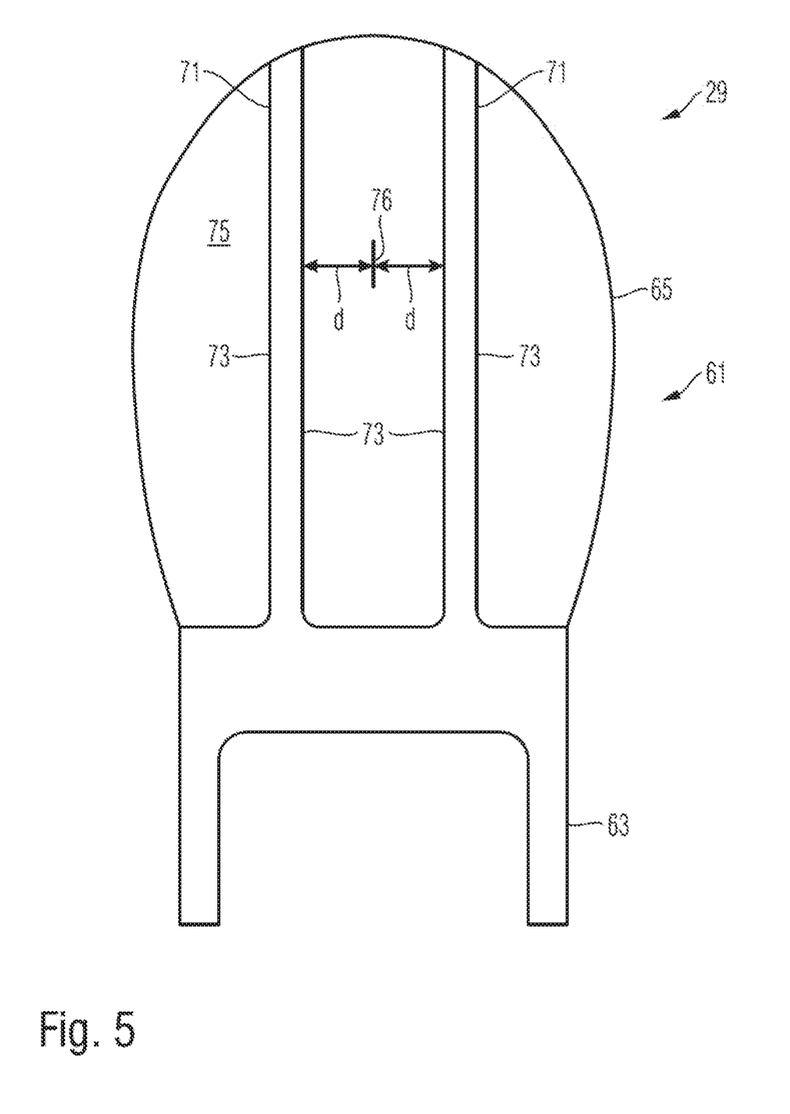
FIG. 5 is an elevational view of the mirror body shown in FIGS. 3 and 4.

FIGS. 3, 4 and 5 illustrate a configuration of the rotating mirror 29 in more detail. Herein, FIG. 3 is a sectional view of the rotating mirror, FIG. 4 is a perspective view of the rotating mirror, and FIG. 5 is an elevational rear review of the rotating mirror 29.

The rotating mirror 29 comprises a mirror body 61 made of plastic by injection molding. The total mass of the mirror body is about 10 grams. The mirror body 61 comprises a base portion 63 configured to be mounted on a carrier which can be rotated about an axis of rotation 33. In the present example, the carrier is the shaft 31 of the motor 27.

The mirror body 61 further comprises a mirror portion 65 providing a mirror surface 35. The mirror surface 35 is inclined relative to the axis of rotation 33. The mirror portion 65 has a proximal section 66 closer to the base portion 63 and a distal portion 67 farther away from the base portion 63. When the mirror body 61 is rotated about the axis of rotation 33, centrifugal forces tend to deform the mirror body 61. Specifically, a force indicated by an arrow 69 in FIG. 3 tries to orient the mirror portion 65 such that the mirror surface 35 is oriented orthogonal to the axis of rotation 33. Such deformation of the mirror portion 65 will deteriorate the optical properties of the surveying system 1 using the rotating mirror 29. In order to support the mirror portion 65 relative to the base portion which is mounted on the carrier 31 and in order to prevent deformation of the mirror body 61, the mirror body 61 comprises plural spaced apart ribs 71 extending between the mirror portion 65 and the base portion 63. The ribs 71 have main surfaces 73 extending substantially orthogonally to the mirror surface. The ribs 71 are connected to the mirror portion 65 at a rear surface 75 of the mirror portion 67.

The mirror surface 35 has a center 76 where the axis of rotation 33 intersects the mirror surface 35. The mirror surface 35 has a surface normal 77 at its center 76. The main surfaces 73 of the ribs 71 are nearly parallel to the surface normal 77. Specifically, the main surfaces 73 of the ribs 71 are not exactly parallel to the surface normal 77 since the ribs 71 are slightly wedge shaped to allow removal of the mirror body 61 from a mold in its manufacturing process. Moreover, the main surfaces 73 closest to the surface normal 77 have a distance d from the surface normal 77 of 7 mm. This distance d has an effect in that a region close to the center 76 of the mirror surface 35 is not affected by deformations resulting from shrinking of the material of the mirror body 61 upon solidification during manufacture.

The illustrated example of the mirror body 61 includes two ribs 71. However, only one rib or a higher number of ribs can be provided. If the number of ribs is an even number, the distance d between the surface normal 77 and the main surface of the two ribs closest to the surface normal 77 can be maintained.

The mirror body 61 further comprises a portion 79 provided as a counterbalance. Material can be removed from the counterbalance 79 in order to achieve a precise balancing of the mirror body 61 about the axis of rotation 33. It is further possible to add material, such as an adhesive, to various surface portions of the mirror body for achieving precise balancing of the mirror body 61 about the axis of rotation 33.

An encoder ring 81 is mounted on the base portion 63. The encoder ring 81 carries a plurality of optical marks which can be detected by a sensor mounted on the mounting structure 25 of the measuring unit 24 for determining the rotational position of the rotating mirror 29.

Figure 6:
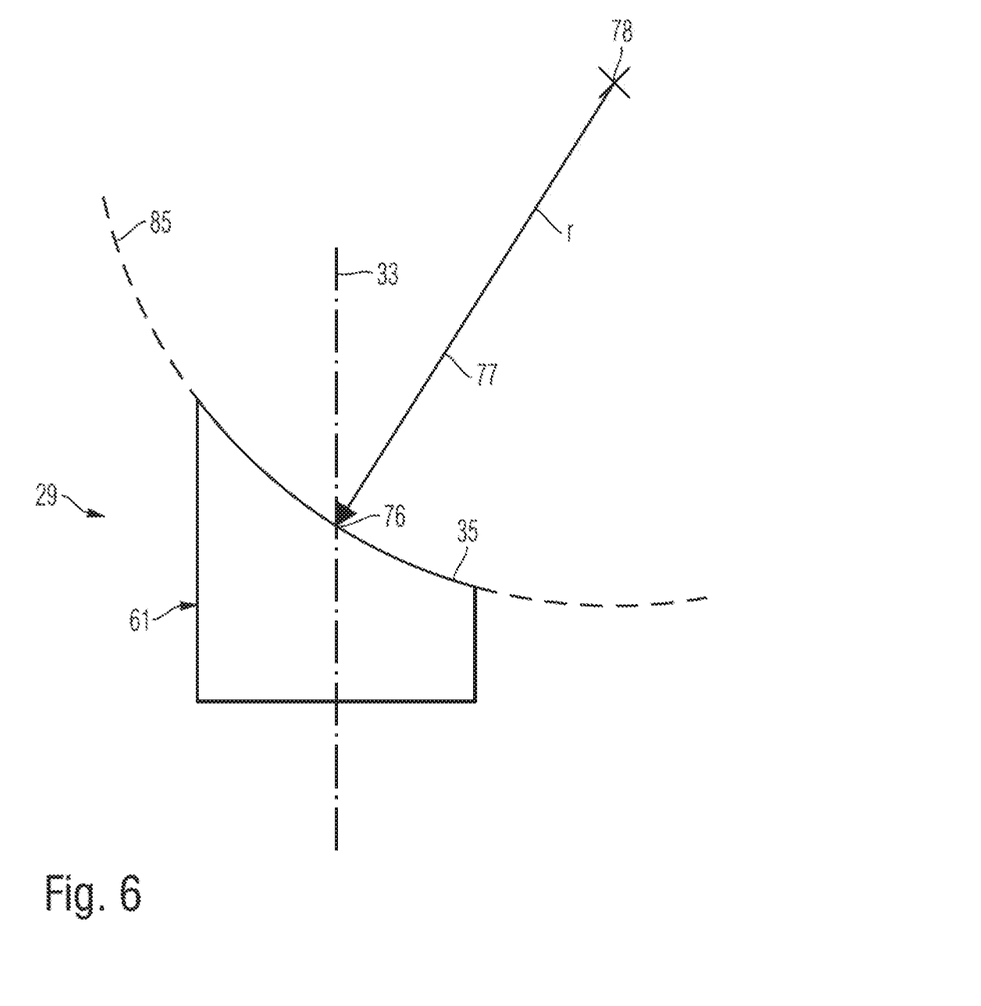
FIG. 6 is an illustration of a detail of a mirror surface of the rotating mirror shown in FIGS. 3 to 5.

FIG. 6 shows a detail of a configuration of the mirror surface 35 according to a particular illustrating example. The mirror surface 35 is a slightly curved surface. The curvature of the mirror surface 35 is exaggerated in the sectional view shown in FIG. 6. The sectional view of FIG. 6 is taken along the same plane as the sectional view of FIG. 3. Reference numeral 85 indicates an osculating circle of the mirror surface 35 at the center 76 of the mirror surface 35, reference numeral 78 indicates a center of the osculating circle 85, and reference numeral r indicates the radius of the osculating circle 85. There is an infinite number of osculating circles differing in their orientations about the surface normal 77. The osculating circle 85 shown in FIG. 6 coincides with the drawing plane of the figure. This osculating circle 85 is not necessarily the smallest osculating circle, i.e. the osculating circle among the possible osculating circles having the smallest radius r.

When the beam 39 of measuring light incident on the mirror surface 35 is a parallel collimated beam, it is advantageous to design the curvature of the mirror surface 35 such that the plane of the smallest osculating circle is oriented orthogonal to the drawing plane of FIG. 6. This means that the mirror surface 35 has its highest curvature in the plane orthogonal to the plane of the section shown in FIG. 6. The plane of the section shown in FIG. 6 contains the osculating circle 85 and the axis of rotation 33. According to a particular embodiment, the plane of the smallest osculating circle is oriented orthogonal to the drawing plane of FIG. 6, and the osculating circle in the drawing plane of FIG. 6 has an infinite radius. This means that the surface 35 has a cylindrical shape.

The curved shape of the mirror surface 35 is provided for compensating an astigmatism induced on the beam 39 of measuring light by the window 41. The window 41 has flat surfaces 43 and 51 in the section shown in FIG. 1 and curved surfaces 43 and 51 in the section shown in FIG. 2.

The difference in curvatures in the two orthogonal sections of FIGS. 1 and 2, respectively, results in a change of astigmatism when the beam 39 traverses the window 41.

This change of astigmatism can be at least partially compensated by the curvature of the mirror surface 35 as shown in FIG. 6.

According to an example, the window 49 is made of polycarbonate glass having an index of refraction of about 1.6. The window may have a thickness of 2 mm to 3 mm, and the radius R (see FIG. 2) of the inner surface 43 of the window 41 can be 75 mm, for example. For compensating a change of astigmatism induced by this type of window, the curvature of the mirror surface 35 is designed such that the smallest osculating circle at the point where the axis 33 of rotation intersects the mirror surface 35 is contained in a plane oriented orthogonal to a plane containing the axis 33 of rotation and the center 78 of the osculating circle 85, wherein the osculating circle 85 has a radius r of about 9 m. The section of the mirror surface 35 in a plane corresponding to the section shown in FIG. 6 will then be a straight line.

Additional information relating to surveying instruments having rotating mirrors can be found in the co-pending patent application of the present applicant titled "SURVEYING SYSTEM HAVING A ROTATING MIRROR" which is filed on the same day as the present application, wherein the whole disclosure of this patent application is incorporated herein by reference.

The present application in particular discloses the following combinations of features:

1. A surveying system, comprising a support; a rotating mirror unit including a mounting structure, a motor having a shaft rotatable about a first axis, wherein the motor is mounted on the mounting structure, and a mirror having a mirror surface, wherein the mirror is mounted on the shaft of the motor; and a measuring unit including a mounting structure and a light source and optics mounted on the mounting structure and configured to direct a beam of measuring light onto the mirror surface; a window made of a material transmitting light of the beam of measuring light, wherein the window is arranged in a beam path of the beam of measuring light downstream of the mirror, wherein the window mechanically connects the mounting structure of the measuring unit and the mounting structure of the rotating mirror unit, and wherein one of the mounting structure of the measuring unit and the mounting structure of the rotating mirror unit is mounted on and carried by the support and the other one of the mounting structure of the measuring unit and the mounting structure of the rotating mirror unit is carried by the window.

2. The surveying system of combination 1, wherein the window extends around the first axis over a range of more than 220°, in particular more than 270°.

3. A surveying system, in particular in combination with the surveying system of combination 1 and 2, wherein the surveying system comprises a rotating mirror unit including a motor having a shaft rotatable about a first axis, and a mirror having a mirror surface, wherein the mirror is mounted on the shaft of the motor; and a measuring unit including a light source and optics configured to direct a beam of measuring light onto the mirror surface; a window made of a material transmitting light of the beam of measuring light, wherein the window is arranged in the beam path of the beam of measuring light downstream of the mirror, and wherein the window extends around the first axis over a range of more than 220°, in particular more than 270°, at a constant distance from the first axis.

4. The surveying system of combination 3, wherein the window is formed of one integral piece of transparent material.

5. The surveying system of combination 3 and 4, further comprising a support carrying one of the rotating mirror unit and the measuring unit.

6. The surveying system of combinations 1 to 5, further comprising a base, wherein the support is mounted on the base and rotatable relative to the base about a second axis oriented transverse to the first axis.

7. The surveying system of combination 6, further comprising a tripod, wherein the base is mounted on the tripod.

8. The surveying system of combinations 1 to 7, wherein the window fully surrounds the first axis.

9. The surveying system combinations 1 to 8, wherein the window has first and second surfaces traversed by the beam of measuring light, wherein a smallest angle between a direction of the beam of measuring light traversing the window and a surface normal of the first surface at locations where the beam of measuring light traverses the first surface is greater than 1° and in particular greater than 2°, and/or wherein a smallest angle between the direction of the beam of measuring light traversing the window and a surface normal of the second surface at locations where the beam of measuring light traverses the second surface is greater than 1° and in particular greater than 2°.

10. The surveying system of combination 9, wherein the surface normals of the first surface coincide with the surface normals of the second surface.

11. The surveying system of one of combinations 1 to 10, wherein the mirror surface is a curved surface having a smallest osculating circle at a point here the first axis intersects the mirror surface, and wherein the smallest osculating circle is contained in a plane substantially orthogonal to a plane containing the axis of rotation and a center of the osculating circle.

12. The surveying system of combinations 1 toll, wherein the light source and optics are configured to emit the beam of measuring light along an axis substantially coinciding with the first axis.

13. A lightweight rotating mirror, comprising a body; wherein the body includes a base portion configured to be mounted on a carrier rotatable about a rotation axis, wherein the body includes a mirror portion providing a mirror surface carrying a metal layer, wherein the body includes plural spaced apart ribs extending between the mirror portion and the base portion, and wherein the base portion, the mirror portion and the plural ribs are integrally made of plastic.

14. The lightweight rotating mirror of combination 13, wherein the body is formed by injection molding.

15. The lightweight rotating mirror of combinations 13 and 14, wherein an angle between the rotation axis and a surface normal of a central portion of the mirror surface is 45°.

16. The lightweight rotating mirror of combinations 13 to 15, wherein the ribs have main surfaces having surface portions extending substantially orthogonally to the mirror surface.

17. The lightweight rotating mirror of combination 16, wherein the two main surfaces of the ribs closest to a surface normal of the mirror surface at a location where the rotation axis intersects the mirror surface have a distance from the surface normal of more than 3 mm and in particular more than 5 mm.

18. The lightweight rotating mirror of combinations 13 to 17, wherein a number of the plural ribs is an even number.

19. The lightweight rotating mirror of combinations 13 to 18, wherein the body has a mass of less than 0.020 kg.

20. The lightweight rotating mirror of combinations 13 to 19, further comprising an encoder ring mounted to the base portion.

21. The lightweight rotating mirror of combinations 13 to 20, further comprising a motor having a rotatable shaft, wherein the base portion is fixed to the shaft.

22. The lightweight rotating mirror of combinations 13 to 21, wherein the base portion is fixed to the shaft by an adhesive.

23. The surveying system of combinations 1 to 12, wherein the surveying system includes the lightweight rotating mirror of combinations 13 to 22.

Some embodiments have been described in connection with the accompanying drawing. However, it should be understood that the figure is not drawn to scale. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

For purposes of this disclosure, certain aspects, advantages, and novel features are described herein. It is to be understood that not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Moreover, while illustrative embodiments have been described herein, the scope of any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to the examples described in the present specification or during the prosecution of the application, which examples are to be construed as non-exclusive. Further, the actions of the disclosed processes and methods may be modified in any manner, including by reordering actions and/or inserting additional actions and/or deleting actions. It is intended, therefore, that the specification and examples be considered as illustrative only, with a true scope and spirit being indicated by the claims and their full scope of equivalents.

The invention claimed is:

1. A surveying system, comprising:
a support;
a rotating mirror unit including:
a mounting structure,
a motor having a shaft rotatable about a first axis, wherein the motor is mounted on the mounting structure, and
a mirror having a mirror surface, wherein the mirror is mounted on the shaft of the motor;
a measuring unit including:
a mounting structure, and
a light source and optics mounted on the mounting structure and configured to direct a beam of measuring light onto the mirror surface; and
a window made of a material transmitting light of the beam of measuring light, wherein the window is arranged in a beam path of the beam of measuring light downstream of the mirror,
wherein the window mechanically connects the mounting structure of the measuring unit and the mounting structure of the rotating mirror unit, and
wherein one of the mounting structure of the measuring unit and the mounting structure of the rotating mirror unit is mounted on and carried by the support and the other one of the mounting structure of the measuring unit and the mounting structure of the rotating mirror unit is carried by the window.

2. The surveying system of claim 1, wherein the surveying system comprises:
a rotating mirror unit including:
a motor having a shaft rotatable about a first axis, and
a mirror having a mirror surface, wherein the mirror is mounted on the shaft of the motor;
a measuring unit including:
a light source and optics configured to direct a beam of measuring light onto the mirror surface;
a window made of a material transmitting light of the beam of measuring light,
wherein the window is arranged in the beam path of the beam of measuring light downstream of the mirror, and
wherein the window extends around the first axis over a range of more than 220°, in particular more than 270°, at a constant distance from the first axis.

3. The surveying system of claim 2, wherein the window is formed of one integral piece of transparent material, and the system also includes a support carrying one of the rotating mirror unit and the measuring unit.

4. The surveying system of claim 1, further comprising:
a base, wherein the support is mounted on the base and rotatable relative to the base about a second axis oriented transverse to the first axis; and
a tripod, wherein the base is mounted on the tripod.

5. The surveying system of claim 1, wherein the window fully surrounds the first axis.

6. The surveying system of claim 1,
wherein the window has first and second surfaces traversed by the beam of measuring light,
wherein a smallest angle ($\alpha$) between a direction of the beam of measuring light traversing the window and a surface normal of the first surface at locations where the beam of measuring light traverses the first surface is greater than 1° and in particular greater than 2°, and/or
wherein a smallest angle ($\alpha$) between the direction of the beam of measuring light traversing the window and a surface normal of the second surface at locations where the beam of measuring light traverses the second surface is greater than 1° and in particular greater than 2°,
wherein the surface normals of the first surface coincide with the surface normals of the second surface.

7. The surveying system of claim 1,
wherein the mirror surface is a curved surface having a smallest osculating circle at a point here the first axis intersects the mirror surface, and
wherein the smallest osculating circle is contained in a plane substantially orthogonal to a plane containing the axis of rotation and a center of the osculating circle.

8. The surveying system of claim 1, wherein the light source and optics are configured to emit the beam of measuring light along an axis substantially coinciding with the first axis.

9. The surveying system of claim 1, wherein the surveying system includes a lightweight rotating mirror comprising a body;
wherein the body includes a base portion configured to be mounted on a carrier rotatable about a rotation axis,
wherein the body includes a mirror portion providing a mirror surface carrying a metal layer,
wherein the body includes plural spaced apart ribs extending between the mirror portion and the base portion, and
wherein the base portion, the mirror portion and the plural ribs are integrally made of plastic.

10. The surveying system of claim 1, wherein the window extends around the first axis over a range of more than 220°, in particular more than 270°.

11. A lightweight rotating mirror, comprising a body;
wherein the body includes a base portion configured to be mounted on a carrier rotatable about a rotation axis,
wherein the body includes a mirror portion providing a mirror surface carrying a metal layer,
wherein the body includes plural spaced apart ribs extending between the mirror portion and the base portion, and
wherein the base portion, the mirror portion and the plural ribs are integrally made of plastic.

12. The lightweight rotating mirror of claim 11, wherein the body is formed by injection molding.

13. The lightweight rotating mirror of claim 11, wherein an angle between the rotation axis and a surface normal of a central portion of the mirror surface is 45°.

14. The lightweight rotating mirror of claim 11, wherein the ribs have main surfaces having surface portions extending substantially orthogonally to the mirror surface.

15. The lightweight rotating mirror of claim 14, wherein the two main surfaces of the ribs closest to a surface normal of the mirror surface at a location where the rotation axis intersects the mirror surface have a distance (d) from the surface normal of more than 3 mm and in particular more than 5 mm.

16. The lightweight rotating mirror of claim 11, wherein a number of the plural ribs is an even number.

17. The lightweight rotating mirror of claim 11, wherein the body has a mass of less than 0.020 kg.

18. The lightweight rotating mirror of claim 11, further comprising an encoder ring mounted to the base portion.

19. The lightweight rotating mirror of claim 11, further comprising a motor having a rotatable shaft, wherein the base portion is fixed to the shaft.

20. The lightweight rotating mirror of claim 11, wherein the base portion is fixed to the shaft by an adhesive.

* * * * *